United States Patent [19]

Peterson

[11] Patent Number: 5,433,058
[45] Date of Patent: Jul. 18, 1995

[54] SYSTEM, METHOD, AND APPARATUS FOR PACKAGING BALES OF HAY

[76] Inventor: Robert W. Peterson, 9545 Road "O" S.W., Royal City, Wash. 99357

[21] Appl. No.: 52,333

[22] Filed: Apr. 22, 1993

[51] Int. Cl.⁶ .................. B65B 53/00; B65B 13/12; B65B 41/00
[52] U.S. Cl. ..................... 53/399; 53/398.3; 53/441; 53/556; 53/588
[58] Field of Search .................. 100/13; 156/253, 522; 414/412; 53/529, 588, 210, 389.3, 438, 399, 441, 556, 133.8, 412

[56] References Cited

U.S. PATENT DOCUMENTS

| | | | |
|---|---|---|---|
| 1,870,519 | 8/1932 | Leguillon . | |
| 2,974,457 | 3/1961 | Saxton | 100/13 |
| 3,385,024 | 5/1968 | Piazze et al. | 53/412 |
| 3,807,132 | 4/1974 | Kamiya | 53/204 |
| 3,914,918 | 10/1975 | Laird | 53/24 |
| 4,050,220 | 9/1977 | Lancaster et al. | 53/198 |
| 4,317,322 | 3/1982 | Lancaster et al. | 53/399 |
| 4,553,374 | 11/1985 | Lancaster et al. | 53/465 |
| 4,555,017 | 11/1985 | Blackmore | 206/83.5 |
| 4,563,857 | 1/1986 | Bergling et al. | 53/399 |
| 4,599,939 | 7/1986 | Fleissner | 100/2 |
| 4,608,807 | 9/1986 | Skripalle | 53/399 |
| 4,676,048 | 6/1987 | Lancaster et al. | 53/399 |
| 4,676,153 | 6/1987 | Ast | 100/7 |
| 4,712,354 | 12/1987 | Lancaster et al. | 53/399 |
| 4,718,335 | 1/1988 | Ast | 100/3 |
| 4,730,436 | 3/1988 | Angelino | 53/170 |
| 4,738,079 | 4/1988 | Lancaster et al. | 53/450 |
| 4,763,574 | 8/1988 | Ast | 100/98 |
| 4,765,120 | 8/1988 | Phillips | 53/389.3 X |
| 4,793,124 | 12/1988 | Anderson | 53/588 |
| 4,866,909 | 9/1989 | Lancaster, III et al. | 53/399 |
| 4,949,533 | 8/1990 | Bate | 53/556 |
| 4,953,336 | 9/1990 | Lancaster, III et al. | 53/556 |
| 5,001,974 | 3/1991 | Gombos | 100/4 |
| 5,012,631 | 5/1991 | Hostetler et al. | 53/588 |
| 5,027,582 | 7/1991 | Dearwester | 53/399 |
| 5,088,271 | 2/1992 | Westaway | 53/529 X |
| 5,090,177 | 2/1992 | Gombos et al. | 53/399 |
| 5,111,931 | 5/1992 | Gombos et al. | 206/83.5 |
| 5,140,800 | 8/1992 | Martin et al. | 53/556 X |
| 5,155,970 | 10/1992 | Moore | 53/399 |
| 5,182,894 | 2/1993 | Bate | 53/399 |

FOREIGN PATENT DOCUMENTS 446015 9/1991 European Pat. Off. ............ 53/556

*Primary Examiner*—Linda Johnson
*Attorney, Agent, or Firm*—Wells, St. John, Roberts, Gregory & Matkin

[57] ABSTRACT

A system for packaging hay bales includes a press for compressing hay to small, compact bales and a wrapping machine which applies multiple sheets of a thin material to form a package of an effective strength that maintains the form and integrity of the hay bales, and prevents them from expanding back to their pre-compressed size. The wrapping machine applies the thin film to successive compressed hay bales such that the material extends therebetween to integrate multiple hay bales into a common bundle. A partial cutting machine positioned downstream of the wrapping machine cuts a portion of the material between adjacent hay bales to provide a detachable seam. A full cutting machine positioned downstream of the partial cutting machine completely cuts the material between selected pairs of adjacent wrapped hay bales to define sets of multiple wrapped hay bales. A method for packaging hay bales, and the resulting packaged set of multiple hay bales, are also described.

37 Claims, 6 Drawing Sheets

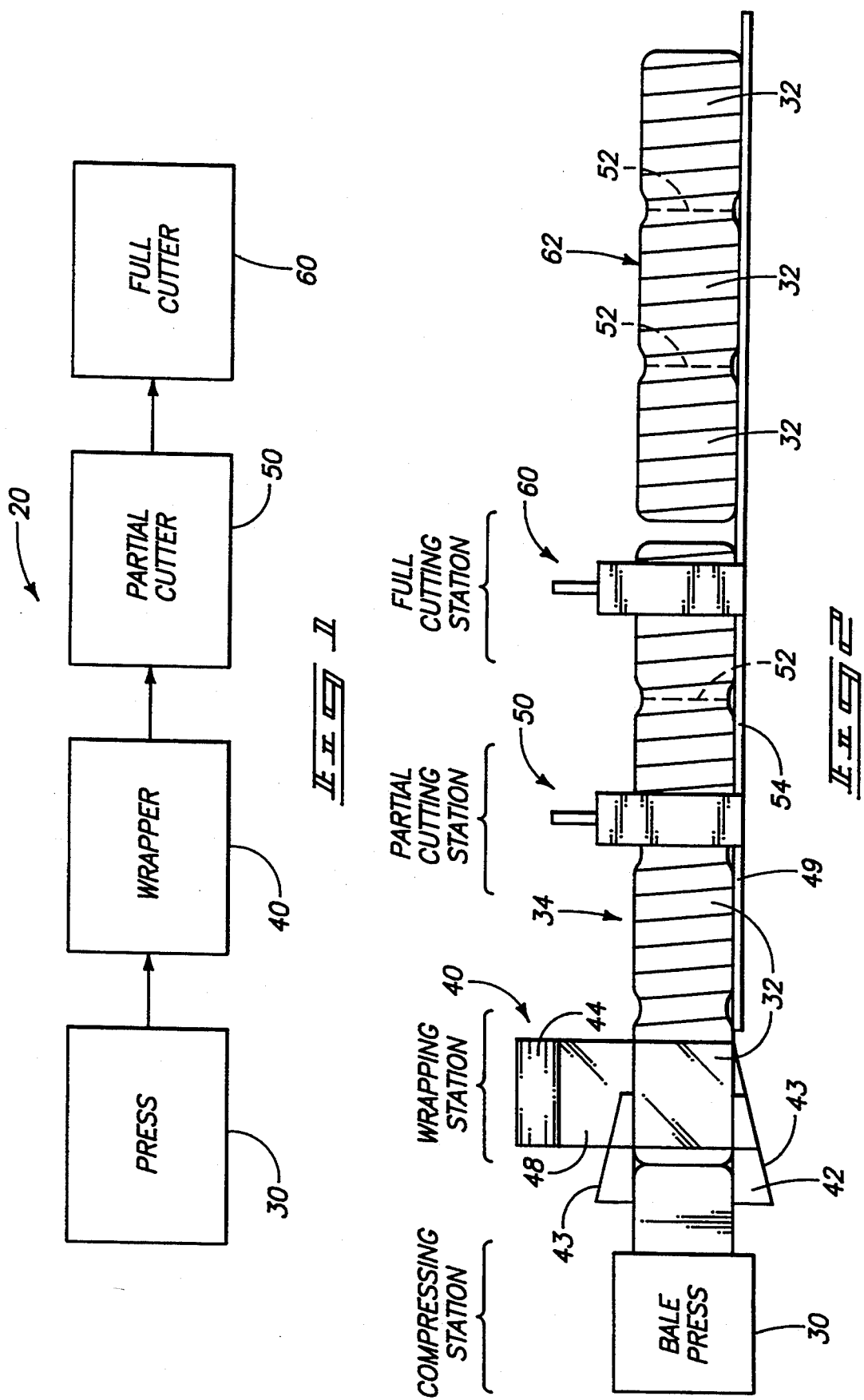

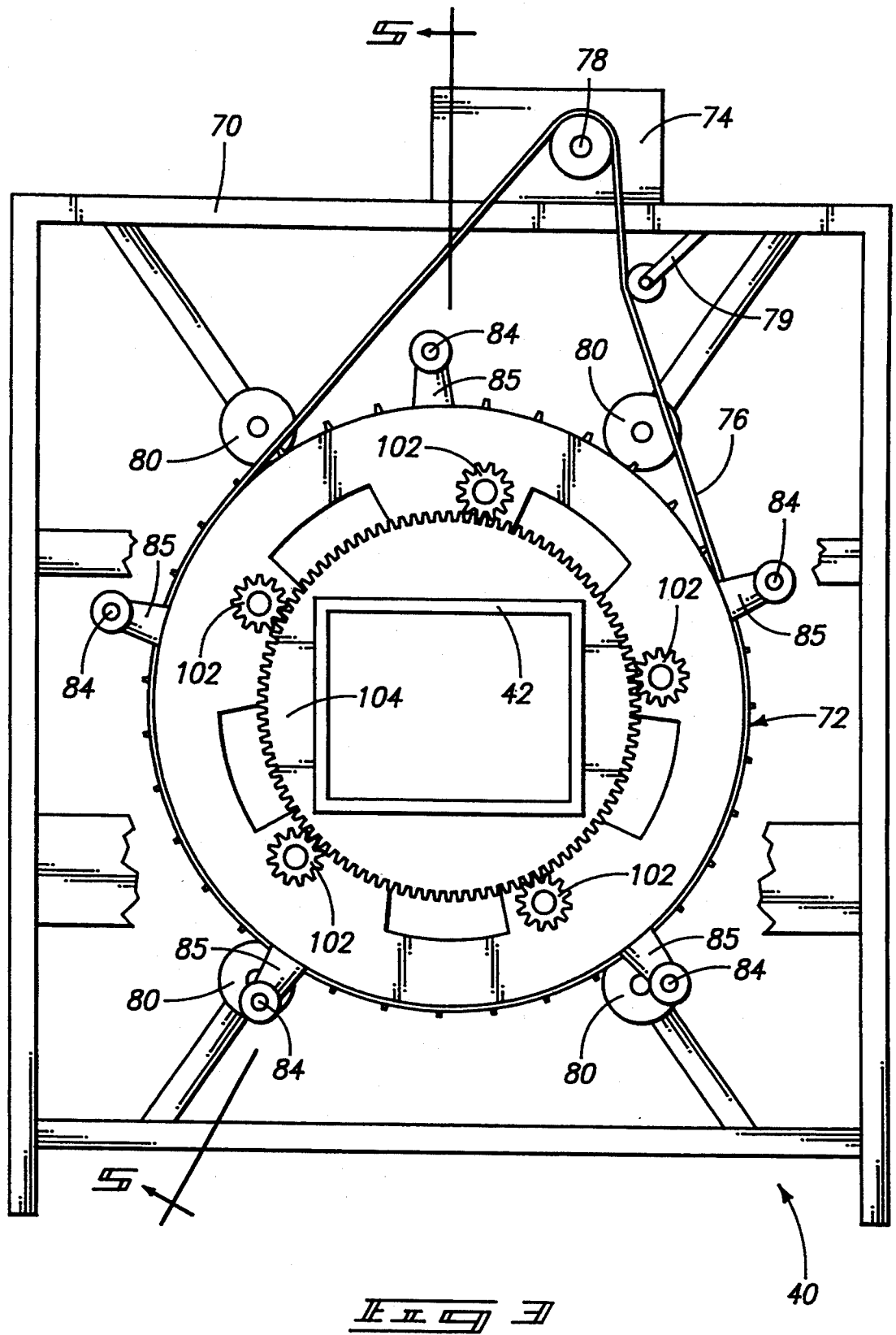

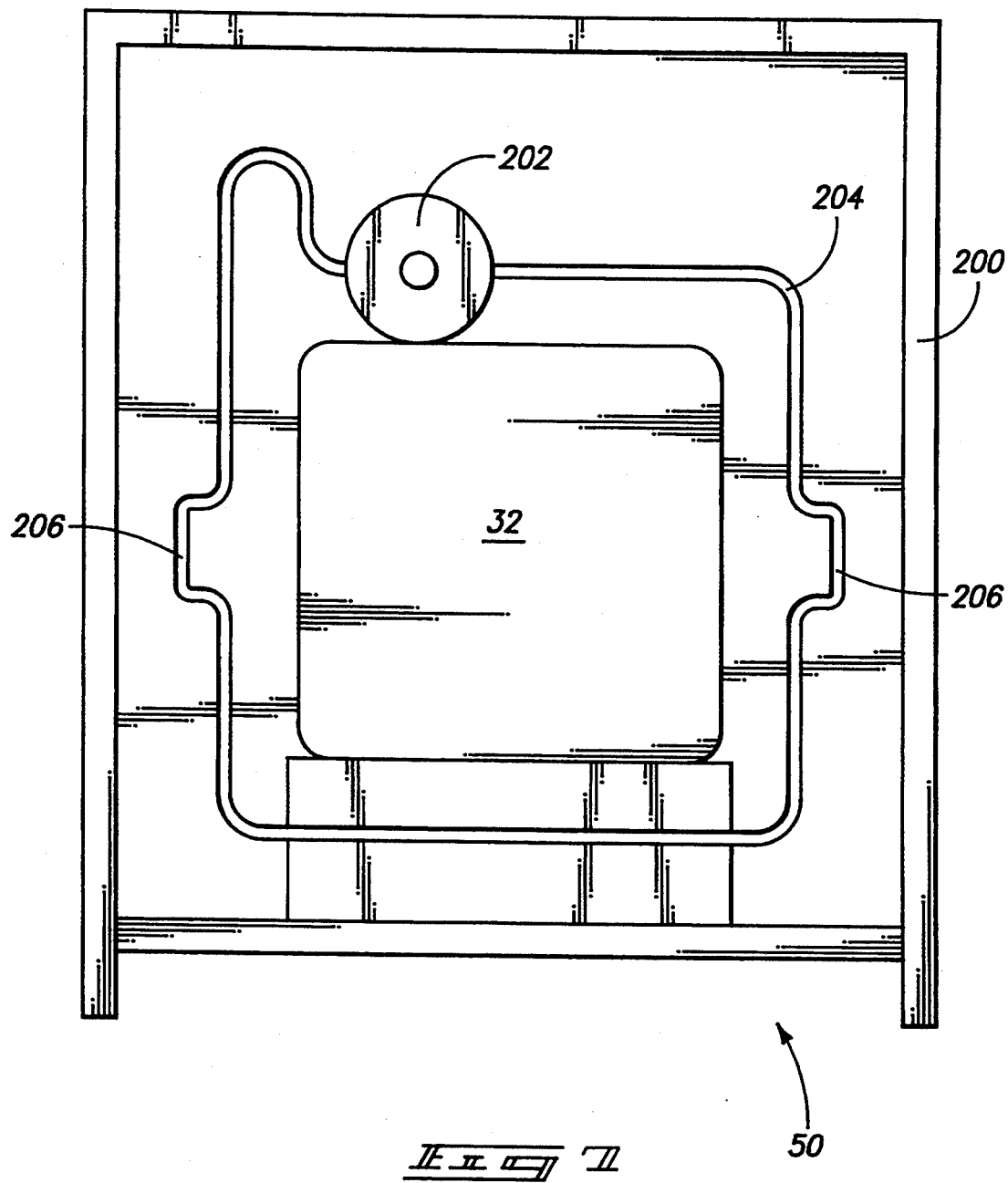

SYSTEM, METHOD, AND APPARATUS FOR PACKAGING BALES OF HAY

TECHNICAL FIELD

This invention relates to a system and method for packaging bales of hay. This invention also relates to a wrapping apparatus. The invention further relates to a package for a set of multiple bales.

BACKGROUND OF THE INVENTION

U.S. farmers export a large amount of hay products to foreign countries each year. The hay is harvested, baled, and then placed in large shipping containers for transfer to foreign countries. To reduce freight costs, it has become a practice within the industry to press hay into small units of higher density so that more hay can be placed within each container. For example, field-baled hay bales are compressed one-third to one-half their original size.

Conventional hay bale recompression systems include a press and a banding machine (or alternately, a twine knotter). The press has a chamber into which a normal-sized hay bale is transferred by an input hydraulic cylinder or ram. Such a hay bale is typically referred to as a "charge of hay". Once inside the chamber, a compression hydraulic ram compacts the hay bale. Thereafter, an output hydraulic cylinder forces the bale from the compression chamber into a strapping chamber at the banding machine.

Conventional banding machines employ four rectangular tracks which surround the strapping chamber. The strapping chamber has peripheral slots that enable the bands or straps to be pulled into the chamber and bound around the hay bales. The bales are indexed to place two sets of straps thereon. The straps maintain the integrity and form of the compressed hay bale.

The bound bales can then be pushed from the banding machine to a cutting unit having a knife or blade which is passed vertically through the bale to sever it into two uniform size and weight bales suitable for handling and shipping. If cut, the two sets of bands are divided such that one set of bands retains the shape of one of the resulting bales, while the second set of bands retains the shape of the other bale. If a large bale is desired, the bale remains uncut. A full bale weighs approximately 150 pounds and a severed baled forms two 75 pound bales. The bales are then placed in shipping containers for export to foreign countries.

Hay bale recompression systems of the type described above are disclosed in U.S. Pat. No. 5,001,974 to Gombos and U.S. Pat. Nos. 4,676,153, 4,718,335, and 4,763,574 to Ast.

Conventional hay bale recompression systems have a significant drawback stemming from the use of the banding machine. Employment of the banding machine introduces inefficiency into the system because the hay bales periodically stop for intervals of 3–5 seconds so that the straps can be placed on them. Because two sets of straps are placed on each bale, the entire system is forced to stop for an interval of 6–10 seconds simply due to the banding apparatus.

Another drawback is that the hay bales must be precisely indexed and positioned within the banding machine so that both sets of bands are not applied in a skewed or off-center manner relative to the bale. If the hay bale is not precisely positioned, the bands may be longitudinally displaced a sufficient amount that, after the bales have been severed at the cutting station, one or more of the bands slip off causing the hay bale to fall apart.

Another problem associated with the banding machine is that it contributes a significant portion of the overall system downtime due to breakdown or cleaning. The banding machine is a relatively delicate instrument as the tracks must be kept clean and the strap guides maintained to insure proper operation.

Another drawback associated with conventional bale recompression systems concerns the resulting bale product. Conventional systems produce a compact hay bale having a set of straps bound around it to hold the bale together. However, the straps are very narrow and often do an inadequate job of holding the hay together as a bale. During transport, portions of the hay bale may be disconnected from the bale and lost, thereby resulting in an inefficient transport of the hay.

Another drawback is that the resulting bale product must be individually carried and placed on a shipping pallet or in the shipping container for export. This is an inefficient and labor-intensive approach to filling the shipping container. U.S. Pat. No. 5,111,931 discloses a technique in which multiple hay bales are arranged in rows and columns, and then bound together as a unit by a sheet of pre-stretched polymeric film to create a "pallet"-size bundle that can be handled by a forklift truck or the like. However, the process in the '931 patent requires that each hay bale within the "pallet"-size bundle be individually banded prior to being wrapped with the film, and thus the problems associated with banding remain. Additionally, each bound bale must be carried and placed in a preset pattern with other bales before the wrap is applied.

U.S. Pat. No. 5,012,631 discloses a portable bale wrapping machine for wrapping a protective plastic film around large bale rolls to protect the bales from weather during outdoor storage. However, the plastic film is applied only to bales of hay that have already been banded with straps. The plastic film is merely for protection from the weather, and is not used to maintain the integrity of the rolled hay bale. Accordingly, the bale wrapper in the '631 patent has the drawback in that the bales of hay must first be banded prior to application of the protective plastic film.

This invention eliminates the above-identified problems of conventional systems by providing a system and method for packaging bales of hay.

BRIEF DESCRIPTION OF THE DRAWINGS

Preferred embodiments of the invention are described below with reference to the following accompanying drawings.

FIG. 1 is a block diagram illustrating a system for packaging bales of hay according to this invention.

FIG. 2 is a diagrammatic illustration of the FIG. 1 system.

FIG. 3 is a diagrammatic front elevational view of a wrapping apparatus constructed according to this invention.

FIG. 7 is a diagrammatic front elevational view of the partial cutting apparatus according to this invention.

DETAILED DESCRIPTION OF THE PREFERRED EMBODIMENTS

Figure 4:
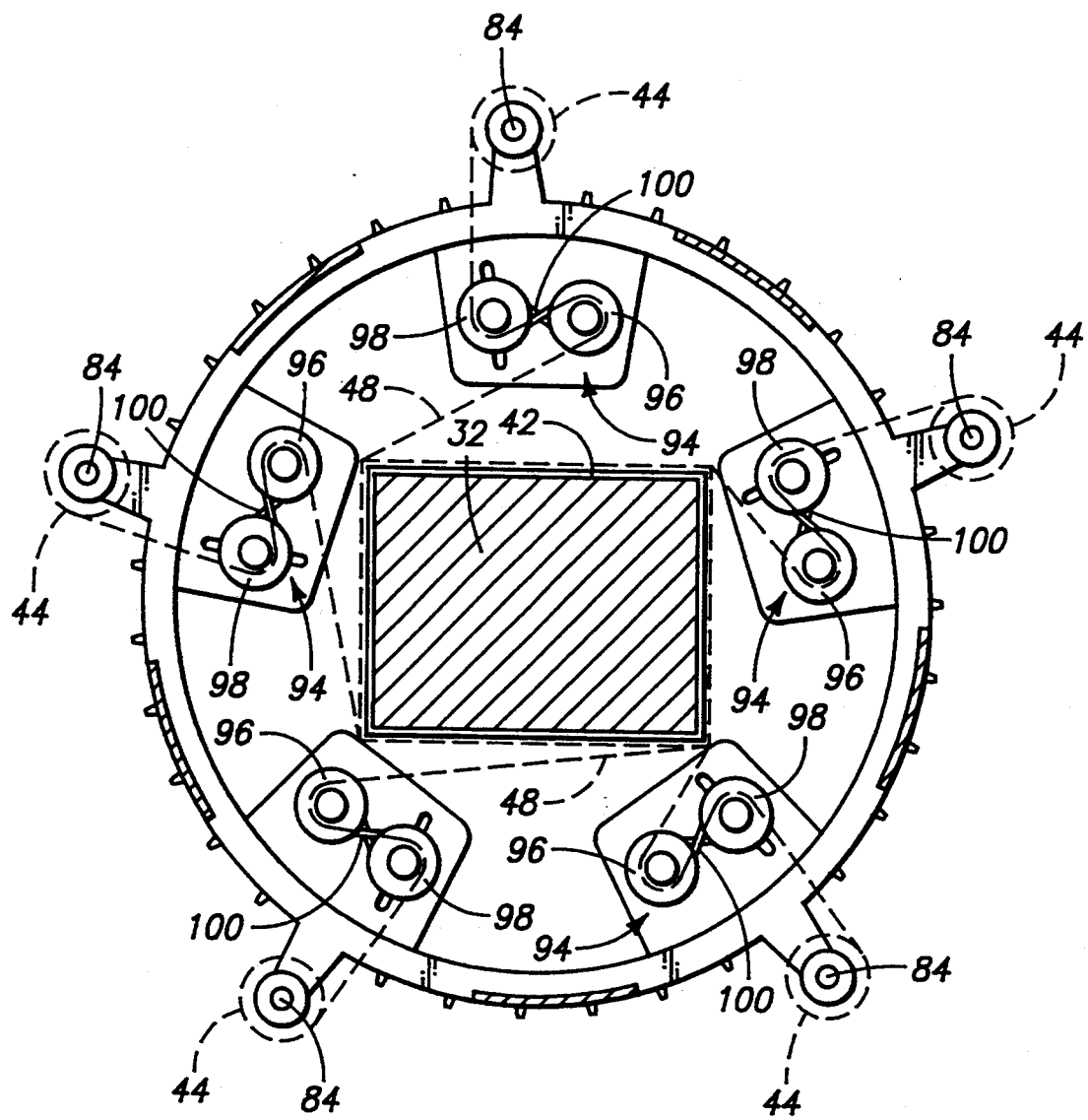
FIG. 4 is a diagrammatic rear elevational view of the wrapping apparatus.

This disclosure of the invention is submitted in furtherance of the constitutional purposes of the U.S. Patent Laws "to promote the progress of science and useful arts" (Article 1, Section 8).

FIG. 1 illustrates a system 20 for packaging bales of hay according to this invention. System 20 consists of a press 30, a wrapping machine 40, a partial cutting machine 50, and a full cutting machine 60. Press 30 is employed to compress a quantity of hay, typically in the form of a common field-baled bale of hay, within a chamber to form a smaller hay bale. The press then transfers the compressed hay bales from the chamber to wrapper 40 which continuously wraps one or more sheets of material around the compressed hay bales as they are extruded through the wrapper. The wrapping machine applies an effective amount of material at a selected wrapping rate so that the compressed hay bales are prevented from expanding back to their pre-compressed dimensions. The material is applied to successive compressed hay bales and extends across the gaps between adjacent wrapped hay bales to integrate multiple hay bales within a common bundle.

The common bundle of hay bales is indexed to a partial cutting machine 50 which cuts a portion of the material in the gaps between adjacent wrapped hay bales to provide a detachable seam and thereby define individual wrapped hay bales. The bundle of hay bales is then transferred to a full cutting machine 60 which completely cuts the material between selected pairs of adjacent hay bales to define sets of multiple wrapped hay bales wherein individual sets have detachable seams between adjacent bales.

Accordingly, system 20 produces sets of wrapped hay bales that are easy to handle with a forklift and can therefore be efficiently loaded into shipping containers. Such packaging eliminates the labor intensive and potentially time-consuming tasks of manually carrying and arranging individual bales on a pallet for loading into a container as is the present industry practice. The resultant package also eliminates the need to bundle pallet-size groups of the pre-bound hay bales as disclosed in U.S. Pat. No. 5,111,931. After the hay has been shipped and unloaded, the detachable seams allow the end user to singulate individual hay bales from the set of hay bales to promote easy handling by an individual person.

FIG. 2 illustrates the system for packaging hay bales in more detail. A quantity of hay is initially transferred to bale press 30. As used in this disclosure, the term "hay" means alfalfa, legumes, and other herbage or grasses. Commonly, hay is a grass that is cut and cured for fodder. The hay typically comes to bale press 30 in the form of a normal-sized field-baled bale of hay which weighs about 150 to 75 pounds and has dimensions of 48"×22"×16". This bale size is suitable for local manual handling and storage, but is too bulky for efficient and cost-effective commercial shipping to foreign markets.

The field-baled hay bales are loaded into a compression chamber within bale press 30. Such loading may be accomplished by a conveyor system, manually, or by some other feed mechanism. Bale press 30 includes rams mounted on hydraulic cylinders which compress the hay bales down to a smaller second size that is one-third to one-half the size of the original bale. For example, a common size for a compressed hay bale is 22" in length, 14-16" in height, and 22" in width. According to some presses, the hay is over-pressed within the chamber to a length of 10-12 inches, but is later permitted to expand to a resulting length of 16-22 inches.

Bale press 30 includes another hydraulic ram which transfers the compressed hay bales from the compression chamber. Alternatively, a conveyor system can be used to transport the bales. The hydraulic ram and conveyor system represent two embodiments of a press means for transferring the hay bales from the chamber. Bale press 30 is of conventional design and is not described in detail in this disclosure. The bale presses disclosed in U.S. Pat. Nos. 5,001,974 and 4,676,153 are suitable for use within the system constructed according to this invention.

The press transfer means moves the compressed hay bales from the compression station downstream to the wrapping station. More specifically, the hay bales are turned 90° sideways as they are pushed to the wrapping station. At the wrapping station, a wrapping machine 40 is positioned and aligned to receive the compressed hay bales from bale press 30. Wrapping machine 40 has a conduit 42 through which the compressed hay bales 32 are extruded under force from the press transfer means. The conduit is dimensioned to retain the size of the compressed hay bales 32. Conduit 42 preferably defines a rectangular-shaped passageway having a height of 14-16 inches and a width of 14-16 inches. Wrapping machine 40 further includes a rotatable wheel (not shown in this Figure) which carries at least one spool of material 44 around the compressed hay bales 32 as they are extruded through and out of conduit 42. In the preferred embodiment, the rotating wheel of wrapping machine 40 supports multiple spools of material to dispense multiple layers of material during each revolution of the wheel. The material is preferably plastic, such a stretch-wrap or shrink-wrap plastic, and more preferably, ultra-high molecular weight plastic. The wrapping machine is discussed below in more detail with reference to FIGS. 3-6.

Compressed hay bales 32 are extruded through and out of conduit 42 at a selected extruding rate that is preferably 18-22 inches per 3-5 seconds. Simultaneously, the wrapping machine applies an effective amount of material at a selected wrapping rate that prevents the compressed hay bales from expanding back to their pre-compressed size. The preferred amount of material is sufficient to provide a wrapping strength in the range of approximately 480-2400 pounds of tensile strength per 22" bale, depending upon the type of hay being wrapped. For alfalfa, a lower strength (such as 480-500 pounds) is effective to maintain the integrity and dimensions of the compressed bale. For some grasses, the wrap should have a higher strength of approximately 2400 pounds in order to retain the form of the compressed hay bale.

The amount of material applied to the hay bale 32 is dependent upon several variables, including (1) the rate at which the wheel is rotated about the compressed hay bales, (2) the number of spools 44 mounted to the wheel, and (3) the strength of the individual sheets of wrapping material.

As an example group of parameters, assume that system 20 is packaging bales of alfalfa. Six spools of thin strength-wrap material are mounted to the rotating wheel, as represented by spool 44 in FIG. 2. Individual sheets of material 48 provide a layer having a strength of approximately 30–50 pounds of tensile strength. For purposes of this example, a sheet of material has a tensile strength of 40 pounds. Preferably, the sheet of material 48 has a width of approximately 11 inches, and a thickness of approximately 85 gauge. The rotational velocity of wrapping machine 40 is set so that the wheel makes one or more rotations for each extruded hay bale 32. That is, the rotational velocity is synchronized and coordinated with the extruding rate of 18–22 inches per 3–5 seconds, such that one or more rotations of the wheel is made every 3–5 seconds. In this manner, six layers of thin plastic material 48 are simultaneously wrapped around compressed hay bales 32 with the number of rotations being adjusted to achieve the desired package strength. For alfalfa, the wheel would make approximately two rotations. This effectively produces a package having an overall strength of 480 pounds (i.e., 6 layers×40 pounds/layer with two rotations of 11″ wrap per 22″ bale), which is an effective amount to prevent the alfalfa bales from expanding back to their pre-compressed size. Many more rotations per bale would be required for other grasses in which an overall strength of 2400 pounds is desired.

The wheel is arranged in relation to conduit 42 such that material 48 is applied partially on conduit 42 and partially on compressed hay bales 32 as they exit from the conduit. More specifically, approximately 6 inches of material 48 overlaps conduit 42 and approximately 5 inches of material overlaps bales 32.

Conduit 42 has tapered exterior walls 43 which help guide sheet 48 onto compressed bales 32. The plastic material preferably sticks to itself, but not to the conduit nor to the hay bales. Accordingly, the right portion of the plastic sheet continuously contacts and meshes with an underlying layer of plastic while the hay bales are being extruded out of conduit 42. Meanwhile, the left portion of the plastic sheet continuously slides off the tapered walls of conduit 42 as it is pulled along by the meshing action occurring at the right portion of plastic.

Wrapping machine 40 continuously applies one or more of layers of material as hay bales 32 are moved through wrapping station 40. According to one aspect of this invention, wrapping machine 40 is equipped with a velocity controller which controllably adjusts the rotational velocity of the rotating wheel. The controller can set the wheel velocity at a constant value or vary it during operation. One advantage to the variable speed controller is that the wrapping operation can be synchronized with the pressing operation. Bale press 30 requires a finite period of time to compress the hay bale to the desired size. Such a period is a commonly 6–10 seconds. Because the flow of compressed hay bales 32 through the system is dependent upon the rate that the bales are moved from the bale press, the flow of hay bales downstream of the press is interrupted periodically during the pressing interval. The ability to adjust the speed of the wrapping machine on the fly is useful so that the wrapping machine can be intermittently slowed or stopped during the pressing interval so as not to waste an inordinate amount of material on the same section of hay bales while the hay bale stream is temporarily stopped. Ideally, the speed is synchronized with the hay bale extrusions so that a substantially constant amount of material is provided on the hay bales.

The constant velocity setting is useful when the system is not dependent upon the flow of hay bales directly from a single bale press. For example, hay bales may be alternately supplied by multiple bale presses such that no delay is experienced in downstream operations. As another example, aspects of this invention may be employed without a bale press wherein an independent supply of compressed bales is fed to the wrapping station. In these situations, the wrapping machine can work at a constant rate.

FIGS. 3–6 illustrate the wrapping machine 40 according to a preferred embodiment of this invention. Wrapping machine 40 includes a frame 70 and a wheel 72 rotatably mounted to frame 70. Conduit 42 is fixedly mounted to frame 70 at a central location relative to wheel 72. In this manner, wheel 72 rotates about a feed axis along which a stream of hay bales are passed through conduit 42. Wrapping machine 40 includes a motor or other drive means 74 mounted to frame 70, and a drive coupling 76 for interconnecting drive shaft 78 with rotatable wheel 72. Drive coupling 76 is illustrated as a chain and sprocket mechanism, but can be provided in other forms, such as a belt and roller assembly or a gear assembly. A chain tensioner 79 is employed to remove the slack from the coupling chain.

Wrapping machine 40 includes multiple guide and support wheels 80 which are rotatably mounted to frame 70 to support wheel 72. Rollers 80 sit on a track 82 (FIGS. 5 and 6) and provide relatively friction-free support for wheel 72.

Figure 5:
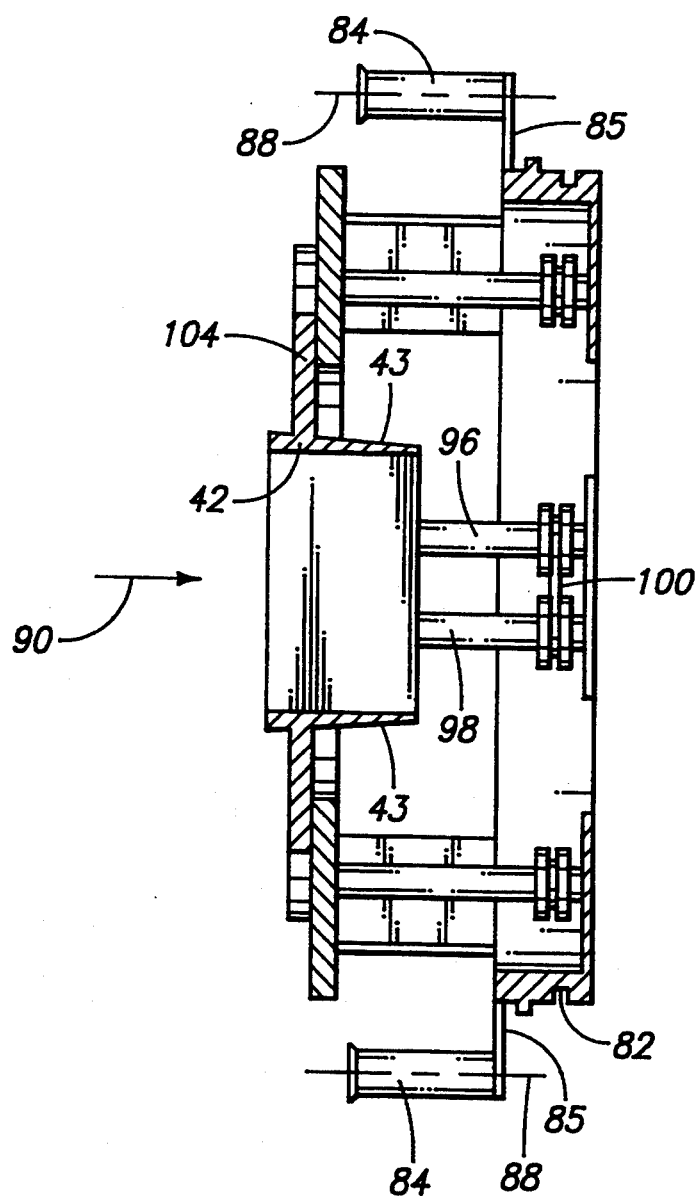
FIG. 5 is a diagrammatic cross-sectional view taken through lines 5—5 of FIG. 3.

In this embodiment, wrapping machine 40 has five spool shafts 84 mounted to radial spokes 85 of wheel 72. Spool shafts 84 are evenly spaced about the circumference of the wheel to support individual spools of plastic wrap 44 (FIG. 4). Preferably, spool shafts 84 are aligned along axes 88 which are substantially parallel to feed axis 90 (FIG. 5). More or less than five spool shafts can be mounted to wheel 72, with 5–10 such shafts being most preferred. Multiple spool shafts are advantageous because such a construction can efficiently apply multiple layers of material while operating for longer periods of time before replacement spools of material are needed.

Figure 6:
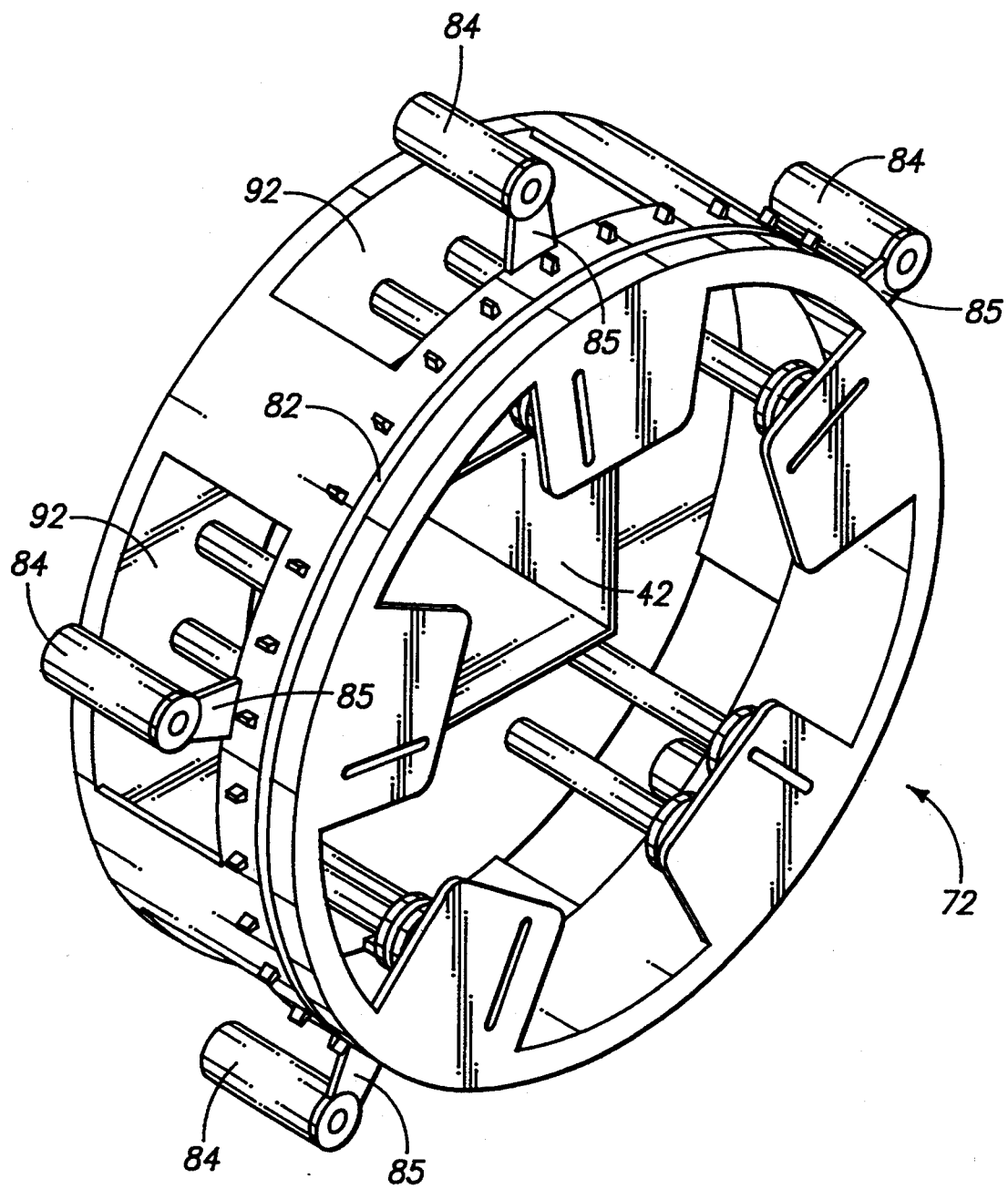
FIG. 6 is a diagrammatic perspective view of the wrapping apparatus.

Wheel 72 is preferably a cylindrical-shaped drum having multiple windows 92 formed therein beneath corresponding spool shafts 84 (FIG. 6). Spool shafts 84 are mounted to the radial spokes outside of the drum. The sheets of material 48 dispensed from the spools of material 44 enter the drum through corresponding windows 92 (FIG. 4).

Wrapping machine 40 also includes multiple pairs of discharging rollers 94 which are rotatably mounted to wheel 72 for guiding individual plastic sheets 48 from spools 44 toward conduit 42. Individual roller pairs 94 include a first or drive roller 96 and a second or driven roller 98. Rollers 96 and 98 are coupled by a drive belt 100 (or alternatively, by a gear arrangement). Drive rollers 96 have corresponding planetary gears 102 (FIG. 3) operatively mounted thereto which mate with and revolve around a large, central, stationary gear 104 as wheel 72 rotates. This in turn causes drive wheel 96 to rotate, which then transfers power via coupling belt 100 to turn driven roller 98.

Stationary gear 104 is fixedly mounted to frame 70 and can be integrally formed with conduit 42. Stationary gear 104 is mounted transverse to the feed axis 90, and more preferably, perpendicularly to the feed axis.

Discharging roller pairs 94 therefor spin at a rate according to gear ratios of corresponding planetary gears 102 to stationary gear 104. The smaller the planetary gear 102, the faster the discharging rollers will spin.

Conversely, large planetary gears 102 induce a relatively slower spin of discharging rollers 94. Gear size is selectable to create the desired stretching of the plastic material as it is being wound around compressed bales of hay. As shown in FIG. 4, individual sheets 48 are guided from spool 44 through discharging roller pairs 94 onto hay bale 32. A large gear size causes proportionately more stretching to occur because the discharging rollers spin at a lower velocity. Alternatively, a smaller gear size causes less stretching because the rollers rotate at a high velocity. Preferably, the sizes of planetary gears 102 are selected to induce a stretch of approximately 25%. In other situations, it may be preferred to create a more significant stretch using material with inherent memory that will shrink back toward its pre-stretched form after it has been wound onto the compressed hay bales.

While the preferred embodiment employs a rotating wheel to apply the plastic wrap, another less preferred embodiment of a system for packaging hay bales according to an aspect of this invention is to rotate conduit 42 within a stationary frame having spools of material mounted thereto. Other means for wrapping material around the compressed hay bales may also be employed.

Returning to FIG. 2, wrapped hay bales 32 are transferred from the wrapping station to the partial cutting station along a support platform 49 which comprises a conveyor, rollers, or a relatively flat sliding surface. A partial cutting machine 50 is positioned downstream of the wrapping machine at the partial cutting station. Partial cutting machine 50 cuts a portion of the material 48 between adjacent wrapped hay bales to provide a detachable seam 52 between individual compressed hay bales 32.

FIG. 7 is a diagrammatic representation of a partial cutting machine according to this invention. Partial cutting machine 50 comprises a frame 200 which supports a cutting apparatus therein. The machine includes a blade or cutting disk 202 which is operably movable about a guide path 204. Cutting disk 202 may be formed as a sharpened circular blade which physically severs the wrapping material or alternatively, the disk 202 can be heated to a sufficient temperature whereby the disk effectively melts the plastic wrap and thereby severs it. Guide path 204 is positioned sufficiently close to hay bales 32 that cutting disk 202 is in contact with the plastic wrap material. Guide path 204 also includes turn-out portions 206 which allow the cutting disk 202 to be removed from the plastic wrap to thereby leave a portion of the plastic wrap intact. The path 204 can be designed to include more than two turn-out portions or with a larger turn-out portion depending upon the desired strength of the resulting detachable seam. Cutting disk 202 is maneuvered about guide path 204 by a drive mechanism which is not shown.

Partial cutting machine 50 is preferably synchronized to partially sever the material between adjacent wrapped hay bales during the pressing interval in which upstream hay bales are being compressed within bale press 30. Because compression typically takes 6–10 seconds, cutting disk 202 makes one revolution about path 204 in less than 6 seconds. More preferably, one revolutionary trip takes approximately 2–3 seconds.

While the embodiment of FIG. 7 is preferred, other partial cutting mechanisms may be employed in this invention. For example, a mechanism designed to uniformly perforate the material may be employed to create a detachable seam.

Returning to FIG. 2, the wrapped hay bales are transferred downstream from the partial cutting station to the full cutting station along support platform 54. A full cutting machine 60 is positioned at the full cutting station to completely sever the material between selected pairs of adjacent wrapped hay bales. In this manner, system 20 effectively produces a set 62 of multiple wrapped hay bales 32 wherein a detachable seam 52 is provided between individual adjacent hay bales. The number of hay bales per set 62 is selected by the user according to the size of the shipping container. A packaged set of 4–8 compressed hay bales is a manageable bundle that can be easily handled by a forklift or the like when loading the bales into a container.

Cutting machine 60 could be configured in many different embodiments. For example, cutter 60 could be substantially similar to partial cutting machine 50 shown in FIG. 7 with the guide track tool 204 modified to eliminate the turn-out portions 206. Alternatively, cutter 60 could comprise a single knife blade or heating element which travels entirely through the gap between adjacent wrapped hay bales to sever the material. Such cutters are within the purview of those of ordinary skill in the art, and will not be described in detail.

According to another aspect of this invention, system 20 produces a packaged set of hay bales 62 (FIG. 2). This packaged set 62 consists of a set of multiple hay bales 32 (preferably, 4–8 hay bales) with each individual hay bale having selected dimensions. At least one layer, find more preferably, multiple layers of material are wrapped around the hay bales wherein the layers of material yield an effective strength that maintains the dimensions of the hay bales. The material extends between adjacent hay bales 32 within set 62. A detachable seam 52 is provided between adjacent hay bales 32 so that individual hay bales can be singulated from set 62.

According to yet another aspect of this invention, a method for packaging bales of hay is described with reference to FIGS. 1 and 2. A quantity of hay, such as a field-baled hay bale, is loaded into a chamber at press 30. Press 30 then compresses the quantity of hay from a first size to a smaller second size to form individual compressed hay bales. The compressed hay bales are transferred from press 30 to the wrapping station, and more particularly, to conduit 42 of wrapping machine 40. Conduit 42 prevents the compressed hay bales from expanding back to their pre-compressed size. The hay bales 32 are extruded from conduit 42 at a rate of approximately 18–22 inches per 3–5 seconds. As hay bales 32 are extruded from conduit 42, wheel 72 of wrapping machine 40 is rotated about the conduit and compressed hay bales to dispense multiple sheets of thin plastic material partially on the conduit and partially on the hay bales. As the wheel revolves, multiple sheets of plastic are wrapped around successive compressed hay bales to form a multi-layer packaging having an effective tensile strength (e.g. 480–2400 lbs.) which prevents the compressed hay bales from expanding back to their first pre-compressed size. The plastic is preferably stretched as it is wrapped around the hay bales.

The rotating wheel continuously applies the layers of plastic so that the packaging extends between adjacent compressed hay bales to integrate multiple hay bales into a common bundle 34. The velocity of the wheel is preferably intermittently slowed or stopped during the period in which upstream hay bales are being compressed within the press chamber.

Bundle 34 of wrapped hay bales are next transferred to partial cutting machine 50. The packaging between adjacent wrapped hay bales is then partially cut to provide a detachable seam so that individual wrapped hay bales can be easily singulated from other wrapped hay bales. The bundle of wrapped hay bales is then transferred to full cutting machine 60. The full cutting machine completely severs the packaging between selected pairs of adjacent wrapped hay bales to define sets 62 of multiple wrapped hay bales 32 with the detachable seam 52 being provided between the hay bales within the individual sets.

The system according to this invention is advantageous over prior art systems in that it eliminates the use of straps to hold individual hay bales together. The multi-layer wrap applied by the rotating wheel replaces the straps. Thus, the banding machine is not used in this system. Accordingly, the problems associated with the banding machine and straps are obviated.

The incorporation of a partial cutting machine offers another significant advantage. The system produces sets of multiple wrapped hay bales which are too heavy for human lifting, but are easily managed with a forklift. Due to the partial cutting machine, each set has detachable seams between the wrapped hay bales. Accordingly, individual bales can be singulated from this set by tearing the bale at the detachable seam. Each of these individual bales can be conveniently handled by a human.

In compliance with the statute, the invention has been described in language more or less specific as to structural and methodical features. It is to be understood, however, that the invention is not limited to the specific features described and shown, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A system for packaging bales of hay comprising:
a wrapping machine having a conduit through which hay bales are extruded along a feed axis, the wrapping machine having means for wrapping material around the hay bales as the hay bales are extruded in end-to-end relation through and out a discharge end of the conduit, the wrapping machine applying the material to pairs of successive hay bales such that the material extends between adjacent ends of wrapped pairs of hay bales; and
a partial cutting machine provided downstream of the wrapping machine and discharge end of the conduit to receive the wrapped hay bales, the partial cutting machine cutting slits in successive increments transversely to the feed axis through the material between adjacent ends of the wrapped hay bales to provide a detachable seam between individual hay bales of each pair.

2. A system according to claim 1 wherein the material comprises plastic.

3. A system according to claim 1 wherein the material comprises ultra high molecular weight plastic.

4. A system according to claim 1 wherein the conduit is stationary and has fixed has tapered exterior walls.

5. A system according to claim 1 wherein the wrapping machine is configured to wrap the material partially on the conduit and partially on the compressed hay bales exiting from the conduit.

6. A system according to claim 1 wherein the wrapping means further comprises:
a wheel rotatably mounted to a frame;
drive means for rotating the wheel;
a plurality of spool shafts mounted to the wheel for supporting multiple spools of material; and
the wheel dispensing individual sheets of material from the spools as the wheel rotates to wrap the sheets of material around the hay bales as the hay bales are extruded through the conduit.

7. A system according to claim 1 wherein the wrapping means further comprises:
a wheel rotatably mounted to a frame;
drive means for rotating the wheel;
a plurality of spool shafts mounted to the wheel for supporting multiple spools of material;
a plurality of discharging roller pairs rotatably mounted to the wheel for guiding individual sheets of material from corresponding spools toward the conduit;
a stationary gear fixedly mounted adjacent the wheel;
a plurality of planetary gears operatively coupled to corresponding discharging roller pairs, the planetary gears mating with and revolving around the stationary gear as the wheel rotates, the planetary gears rotating as they revolve around the stationary gear to rotate the discharging roller pairs; and
the wheel dispensing the sheets of material from the spools as the wheel rotates to wrap the sheets of material around the hay bales as the hay bales are extruded through the conduit.

8. A system for packaging compressed bales of hay, the hay being compressed by a press from a first size to a smaller second size, the system comprising:
a wrapping machine positioned to receive the compressed hay bales, the wrapping machine having a conduit through which the compressed hay bales are extruded along a feed-axis, the wrapping machine having a rotating wheel for wrapping material around the compressed hay bales as the hay bales are extruded through and out of the conduit, the wrapping machine applying an effective amount of material at a selected rate that the compressed hay bales are prevented from expanding back to their first size;
the wrapping machine applying the material to successive compressed hay bales such that the material extends between adjacent wrapped hay bales;
wherein the wrapping machine includes drive means for rotating the wheel;
a plurality of spool shafts mounted to the wheel for supporting multiple spools of material;
a plurality of discharging roller pairs rotatably mounted to the wheel for guiding individual sheets of material from corresponding spools toward the conduit;
a stationary gear fixedly mounted adjacent the wheel;
a plurality of planetary gears operatively coupled to corresponding discharging roller pairs, the planetary gears mating with and revolving around the stationary gear as the wheel rotates, the planetary gears rotating as they revolve around the stationary gear to rotate the discharging roller pairs; and
the wheel dispensing the sheets of material from the spools as the wheel rotates to wrap the sheets of material around the hay bales as the hay bales are extruded through the conduit; and a cutting machine positioned downstream of the wrapping machine to receive the wrapped hay bales, the cutting machine one of (1) completely cutting the material transversely to the feed axis between adjacent wrapped hay bales to singulate the hay bales, and (2) partially cutting a series of intermittent slits through the material and transversely around the bales between adjacent wrapped hay bales to provide a detachable seam between individual hay bales.

9. A system according to claim 8 wherein the material comprises plastic.

10. A system according to claim 8 further comprising multiple spool shafts mounted to the wheel for supporting multiple spools of material, the wheel dispensing multiple layers of material during individual revolutions.

11. A system according to claim 8 wherein the conduit has tapered exterior walls.

12. A system according to claim 8 wherein the wheel is arranged in relation to the conduit to wrap the material partially on the conduit and partially on the compressed hay bales exiting from the conduit.

13. A system for packaging bales of hay comprising:
a press for compressing bales of hay within a chamber from a first size to a smaller second size, the compressed hay forming individual hay bales, the press having means for transferring the compressed hay bales from the chamber in a prescribed direction; and a wrapping machine positioned downstream of the press to receive the compressed hay bales, the wrapping machine having a stationary conduit having interior walls for slidably receiving bales from the press and sized to retain the size of the compressed bales, through which the compressed hay bales are extruded at a selected extruding rate under force from the press transfer means, the conduit further including stationary tapered walls with surfaces thereof converging in said prescribed direction toward the interior walls, the wrapping machine having a rotating wheel for wrapping material simultaneously around portions of the stationary tapered exterior walls and the compressed hay bales as the hay bales are extruded through and out of the conduit, the wrapping machine applying an effective amount of material at a selected wrapping rate that the compressed hay bales are prevented from expanding back to their first size;

wherein the wrapping machine further comprises:
drive means for rotating the wheel;
a plurality of spool shafts mounted to the wheel for supporting multiple spools of material;
a plurality of discharging roller pairs rotatably mounted to the wheel for guiding individual sheets of material from corresponding spools toward the conduit;
a stationary gear fixedly mounted adjacent the wheel;
a plurality of planetary gears operatively coupled to corresponding discharging roller pairs, the planetary gears mating with and revolving around the stationary gear as the wheel rotates, the planetary gears rotating as they revolve around the stationary gear to rotate the discharging roller pairs; and the wheel being positioned to dispense the sheets of material from the spools as the wheel rotates to wrap the sheets of material around said portions of the stationary tapered exterior walls of the conduit and the hay bales as the hay bales are extruded through the conduit.

14. A system according to claim 13 further comprising multiple spool shafts mounted to the wheel for supporting multiple spools of material, the wheel dispensing multiple layers of material during individual revolutions.

15. A system according to claim 13 wherein the wheel is arranged in relation to the conduit to wrap the material partially on the conduit and partially on the compressed hay bales exiting from the conduit.

16. A system according to claim 13 wherein the wrapping rate is synchronized with the extruding rate to ensure that an effective amount of material is applied to prevent expansion of the hay bales back to their first size.

17. A system according to claim 13 wherein the wrapping machine includes a velocity controller for intermittently slowing the rotating wheel during a period in which upstream hay bales are being compressed within the press chamber.

18. A system for packaging bales of hay comprising:
a press for compressing a quantity of hay within a chamber from a first size to a smaller second size, the compressed hay forming individual hay bales, the press having means for transferring the compressed hay bales from the chamber along a feed axis;

a wrapping machine positioned downstream of the press to receive the compressed hay bales, the wrapping machine having a conduit through which the compressed hay bales are extruded at a selected extruding rate under force from the press transfer means, the wrapping machine having means for wrapping material around the compressed hay bales as the hay bales are extruded through and out of the conduit, the wrapping machine applying an effective amount of material at a selected wrapping rate that the compressed hay bales are prevented from expanding back to their first size;

the wrapping machine applying the material to successive compressed hay bales such that the material extends between adjacent wrapped hay bales;

a partial cutting machine positioned downstream of the wrapping machine to receive the wrapped hay bales, the partial cutting machine cutting successive slits transversely with respect to said feed axis around the wrapped hay bales through the material between adjacent wrapped hay bales to provide a detachable seam between individual wrapped hay bales; and a full cutting machine positioned downstream of the partial cutting machine, the full cutting machine completely cutting the material between selected pairs of adjacent wrapped hay bales to define sets of multiple wrapped hay bales.

19. A system according to claim 18 wherein the material comprises plastic.

20. A system according to claim 18 wherein the wrapping means is arranged in relation to the conduit to wrap the material simultaneously and partially on the conduit and partially on the compressed hay bales exiting from the conduit.

21. A system according to claim 18 wherein the wrapping means is intermittently slowed during a period in which upstream hay bales are being compressed within the press chamber.

22. A system according to claim 18 wherein the wrapping rate is synchronized with the extruding rate to ensure that an effective amount of material is applied to prevent expansion of the hay bales back to their first size.

23. A system according to claim 18 wherein the wrapping means further comprises:
a wheel rotatably mounted to a frame;
drive means for rotating the wheel;
a plurality of spool shafts mounted to the wheel for supporting multiple spools of material; and
the wheel dispensing individual sheets of material from the spools as the wheel rotates to wrap the sheets of material around the hay bales as the hay bales are extruded through the conduit.

24. A system according to claim 18 wherein the wrapping means further comprises:
a wheel rotatably mounted to a frame;
drive means for rotating the wheel;
a plurality of spool shafts mounted to the wheel for supporting multiple spools of material;
a plurality of discharging roller pairs rotatably mounted to the wheel for guiding individual sheets of material from corresponding spools toward the conduit;
a stationary gear fixedly mounted adjacent the wheel;
a plurality of planetary gears operatively coupled to corresponding discharging roller pairs, the planetary gears mating with and revolving around the stationary gear as the wheel rotates, the planetary gears rotating as they revolve around the stationary gear to rotate the discharging roller pairs; and
the wheel dispensing the sheets of material from the spools as the wheel rotates to wrap the sheets of material around the hay bales as the hay bales are extruded through the conduit.

25. A system according to claim 18 wherein the partial cutting machine comprises a heating element to sever the material.

26. A system according to claim 18 wherein the partial cutting machine is synchronized to partially sever the material during a period in which upstream hay bales are being compressed within the press chamber.

27. An apparatus for wrapping sheets of material around bales of hay, comprising:
a frame;
a hollow conduit fixedly mounted to the frame, the conduit defining a passage through which hay bales are extruded along a feed axis;
a wheel rotatably mounted to the frame to rotate about the feed axis;
drive means for rotating the wheel;
a plurality of spool shafts mounted to the wheel for supporting spools of material;
a plurality of discharging roller pairs rotatably mounted to the wheel for guiding individual sheets of material from corresponding spools toward the conduit;
a stationary gear fixedly mounted adjacent the wheel and transverse to the feed axis;
a plurality of planetary gears operatively coupled to corresponding discharging roller pairs, the planetary gears mating with and revolving around the stationary gear as the wheel rotates, the planetary gears rotating as they revolve around the stationary gear to rotate the discharging roller pairs; and
the wheel dispensing the sheets of material from the spools as the wheel rotates around the feed axis to wrap the sheets of material around the hay bales as the hay bales are extruded through the conduit.

28. An apparatus according to claim 27 wherein the discharging rollers spin at a rate according to gear ratios of the corresponding planetary gears to the stationary gear, the discharging rollers stretching the material in relation to the spin rate thereof.

29. An apparatus according to claim 27 wherein:
the wheel comprises a cylindrical drum having a plurality of windows formed therein for corresponding spool shafts; and
the spool shafts being mounted to and radially outward of the drum, whereby the sheets of material are dispensed from the spools supported by the spool shafts through the corresponding windows in the drum.

30. An apparatus according to claim 27 wherein the spool shafts are mounted to the wheel along axes that are substantially parallel to the feed axis.

31. An apparatus according to claim 27 wherein the conduit has tapered exterior walls.

32. An apparatus according to claim 27 wherein the wheel is arranged in relation to the conduit to wrap the sheets of material partially on the conduit and partially on the compressed hay bales exiting from the conduit.

33. An apparatus according to claim 27 wherein individual discharging roller pairs comprise:
a first roller directly coupled to a corresponding planetary gear;
a second roller spaced from the first roller; and
a drive coupling interconnecting the first and second rollers.

34. A method for packaging bales of hay comprising the following steps:
compressing a quantity of hay within a chamber from a first size to a smaller second size, the compressed hay forming individual hay bales;
transferring the compressed hay bales away from the chamber to a conduit that prevents expansion of the hay bales back to their first size;
extruding the hay bales from the conduit along a feed axis;
rotating a wheel around the conduit at a first velocity, the wheel dispensing multiple sheets of thin material partially on the conduit and partially on the hay bales as the hay bales exit from the conduit;
wrapping the multiple sheets of thin material around successive compressed hay bales as the hay bales are extruded through the conduit;
forming a multi-layer packaging of the multiple sheets, having an effective strength that prevents the compressed hay bales from expanding back to their first size;
extending the packaging between adjacent compressed hay bales to integrate multiple hay bales within a common bundle;
transferring the wrapped hay bales to a partial cutting machine;
partially cutting the packaging to form a line of intermittent slits transversely with respect to the feed axis around the packaging between adjacent wrapped hay bales to provide a detachable seam between adjacent ends of bales in the bundle;

transferring the wrapped hay bales to a full cutting machine; and completely severing the packaging between selected pairs of adjacent wrapped hay bales to define sets of multiple wrapped hay bales with the detachable seam being provided between adjacent wrapped hay bales within individual sets.

35. A method for packaging bales of hay according to claim 34 further comprising extruding the hay bales from the conduit at a rate of approximately 18–22 inches per 3–5 seconds.

36. A method for packaging bales of hay according to claim 34 further comprising stretching the material as the material is wrapped around the hay bales.

37. A method for packaging bales of hay according to claim 34 further comprising intermittently slowing the wheel to a second velocity less than the first velocity during a period in which upstream hay bales are being compressed within the chamber.

* * * * *